United States Patent [19]

Ahrweiler

[11] 4,105,387

[45] Aug. 8, 1978

[54] SIDE SEALING MEANS FOR A CONTINUOUS PRESS

[75] Inventor: Karl-Heinz Ahrweiler, Krefeld, Fed. Rep. of Germany

[73] Assignee: Eduard Küsters, Krefeld-Forstwald, Fed. Rep. of Germany

[21] Appl. No.: 577,877

[22] Filed: May 15, 1975

[30] Foreign Application Priority Data

May 24, 1974 [DE] Fed. Rep. of Germany ....... 2425057

[51] Int. Cl.[2] .......................... A01J 25/12; B28B 3/12

[52] U.S. Cl. ................................ 425/335; 144/281 B; 156/582; 425/371

[58] Field of Search ............... 425/363, 371, 372, 364, 425/329, 335, 115; 156/582; 144/281 R, 281 A, 281 B, 281 C, 283

[56] References Cited

U.S. PATENT DOCUMENTS

| | | | |
|---|---|---|---|
| 2,459,295 | 1/1949 | Skoog | 144/281 B |
| 3,296,658 | 1/1967 | Buff et al. | 425/89 |
| 3,371,383 | 3/1968 | Hellsund | 425/371 X |
| 3,462,795 | 8/1969 | Hermanns | 425/371 |
| 3,487,143 | 12/1969 | Bergvall | 425/115 X |
| 3,568,245 | 3/1971 | Jetzer | 425/372 X |
| 3,764,247 | 10/1973 | Garrett et al. | 425/371 X |
| 3,784,340 | 1/1974 | Kerttula et al. | 425/371 X |
| 3,887,318 | 6/1975 | DeMets | 425/371 |

*Primary Examiner*—Othell M. Simpson
*Assistant Examiner*—W. D. Bray
*Attorney, Agent, or Firm*—Kenyon & Kenyon, Reilly, Carr & Chapin

[57] ABSTRACT

In continuous press having two rotatably driven endless conveyor belts forming opposed, substantially linear spans defining a pressing zone with press platens applying pressure through the traveling spans to work carried therebetween, with antifriction roller means interposed between the platens and spans, means for side sealing between the spans to permit pressing of material which would otherwise be forced out from the gap therebetween, which means move with the spans through the pressing zone, are provided.

6 Claims, 5 Drawing Figures

FIG.4
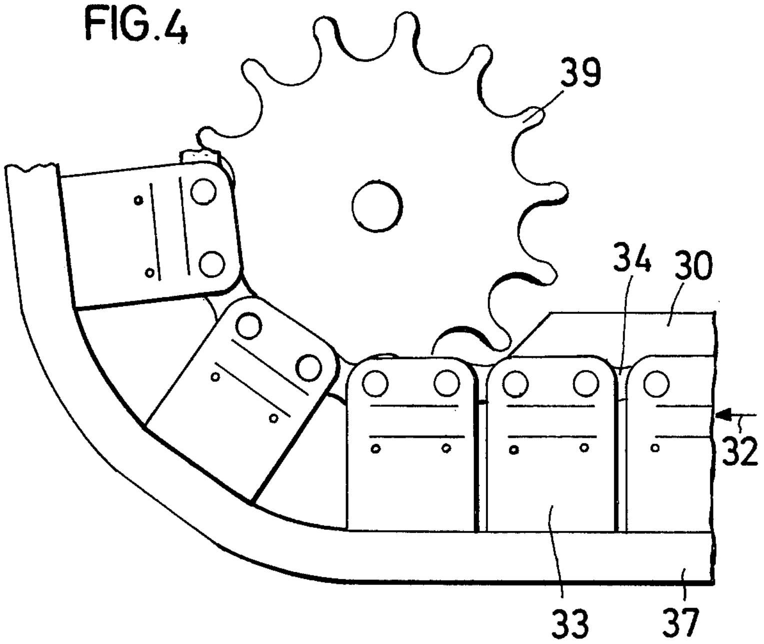
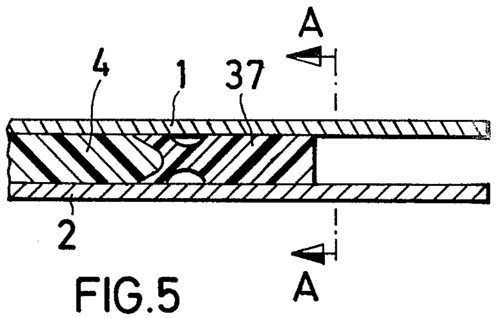
FIG.5

SIDE SEALING MEANS FOR A CONTINUOUS PRESS

BACKGROUND OF THE INVENTION

This invention relates to continuous presses in general and more particularly to an improved continuous press which includes side sealing means to permit the pressing of materials which would otherwise be forced out from between the forming spans in the press.

A continuous press which has two rotatably driven endless conveyor belts (forming bands) forming opposed substantially linear spans defining a pressing zone and which includes press platens applying pressure through the traveling spans to the work carried therebetween with antifriction rollers interposed between the platens and spans is disclosed in U.S. application Ser. Nos. 308,556 and 519,626. Such presses are useful for the continuous production of pressboard panels, panels of synthetic material and panels of other similar materials. In the aforementioned applications, the press is described in conjunction with the production of pressboard panels. However, by nature, such presses are also suitable for numerous other materials. However, when applied to certain materials, a situation may exists in which the material being pressed would be squeezed out from the linear spans. Such does not happen in the case of making pressboard from a mixture of wood chips. However, when soft viscous paste-like material are treated under very high pressure and heat, they can be forced out at the side edges of the belt loops or forming bands. Such occurs, for example, when a press of this nature is used to produce panels made of chips or shavings of thermoplastic synthetic materials which become soft during the pressing process in order to effect a bonding of the entire mixture. Such materials will be squeezed out at the edges since the thermoplastic mass has become plastic during the treatment. As a result, perfect panels can be made because the required pressure will not be built up within the mass, the pressure being released by the squeezing out.

There have been experiments performed in which stationary steel strips have been disposed at the edges of the conveyor belts. These have been used in an attempt to obtain an enclosed pressure space such as the type of obtained in multilayer hydraulic presses. However, the experiments did not yield satisfactory results. Aside from the serious problems of friction, sealing could not be obtained at the high pressures being used. Thus, the need for an effective manner of using such presses with plastic materials which will normally be squeezed out is evident.

SUMMARY OF THE INVENTION

The present invention provides a solution to this problem. In accordance with the present invention seals which move with the conveyor belts forming the linear spans are disposed in the longitudinal zone of the belts at the side edges and result in a perfect seal for the space containing the strip of material being formed. By causing the seals to travel along with the belts friction problems are avoided. Furthermore, by having them travel along it is easier design for higher pressures since sealing action does not take place between parts moving relative to one another, but takes place between parts which move only together. In other words, there is no relative motion between the seals and the belts.

Preferably, the seals are constructed as endless circulating sealing strips which engage with the two belts in a sealing manner prior to the beginning of the longitudinal section in which pressing takes place and release their engagement upon leaving that longitudinal section. As a result, the sealing strips can be independently conducted outside the longitudinal section where the high pressure is applied and sealing forces required.

In preferred form of construction, the sealing strips are disposed in the longitudinal section between the conveyor belts at a positon where the conveyer belts are supported by the supporting structures. The sealing strips act both above and below against the adjacent conveyer belts. By being disposed within the portion of the belts which are supported, adequate sealing is insured. Such would not be the case if they were engaged laterally at the edge of the belts, which edges project from the support structure. At such a position the high pressure could cause a gap to open.

In accordance with the preferred embodiment, the sealing strips include flexible sealing lips opened to the inner space between the conveyer belts. With this design the sealing lips are applied more firmly against the conveyor belts as increasing pressure is exerted. Furthermore, through this design small changes in the spacing are bridged over without a loss of sealing action.

In one illustrated form of construction the sealing strips, at least in the longitudinal section over which pressure is applied, are fastened to one of the conveyor belts so as to resist outwardly acting forces and circulate with this belt.

The sealing strips may, for example, engage in holes in the conveyer belts. If they are sufficiently flexible and do not impair the flexibility of the conveyer belt, they may be cemented or otherwise securely fastened to the belt. Since with a construction of this nature, particularly with high pressures, problems may arise, the preferred design of the present invention provides sealing strips which circulate in horizontal planes situated between the conveyor belts with the sealing strips supported from the outside against outwardly acting forces. As a result, the sealing strips are completely separate from the conveyer belts with respect to mobility and forces.

A particularly advantageous embodiment is described in which sprocket wheels which turn about vertical axes are provided outside and near the longitudinal section to which pressure is applied. Over these sprocket wheels, endless link chains with one length parallel to the edge of the conveyor belts circulate. The link chains are preferably roller chains and run over support arranged parallel to the edge of the conveyor belts. It further advantageous that each second link form a substantially rectangular laterally projecting plate. Between these links are short links so that the rectangular plate forming links, when the link chain is conducted in a straight line, follow one behind the other with only short spacing therebetween. This then forms a substantially uninterrupted support edge for the sealing strip at the projecting side.

BRIEF DESCRIPTION OF THE DRAWINGS

FIG. 4 is a plan view of the end of the circulation path of an embodiment in which chain links support the sealing strip.

FIG. 5 is a partial section through the edge region of the conveyor belts, essentially the same as FIG. 2 but illustrating an alternate form of construction in which the sealing strip is connected to one of the forming bands.

DETAILED DESCRIPTION OF THE PREFERRED EMBODIMENT

Figure 1:
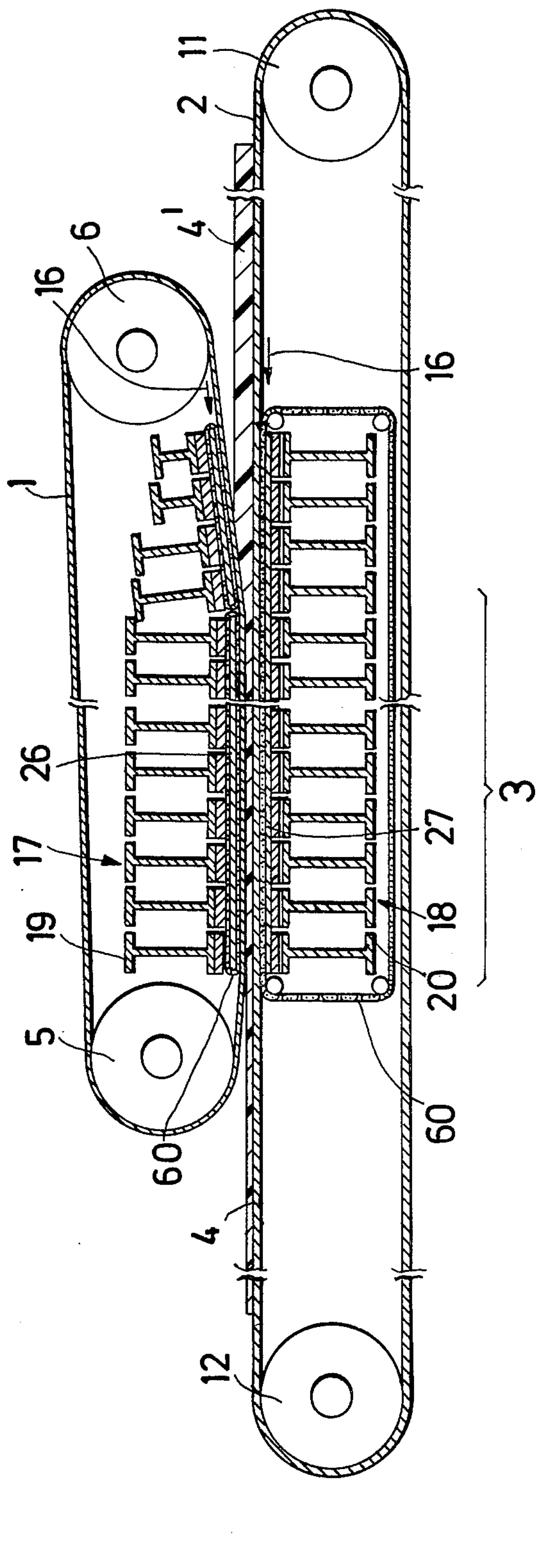
FIG. 1 is a longitudinal vertical section through a press to which the present invention is applied.

FIG. 1 shows the upper and lower endless conveyor belt loops 1 and 2 respectively, which form opposed, substantially linear spans defining the pressing zone embraced by the bracket 3. These belts are made of thin strip steel having a thickness of about 1 to 1.5 mm. and are flexible both longitudinally and transversely. The upper belt 1 is looped around rotative drums 5 and 6. The lower belt 2 at one end loops around a rotative drum 11 with the other end of this lower loop passing around a rotative drum 12.

The work 4 enters at the right hand end of the press in FIG. 1 as loose material 4' and comes out the left hand end with a reduced thickness.

The working spans of the two belts in the zone 3 are pressed together by press platens 27 and 26, the lower platen 27 being held against downward motion by transverse I-beams 20 supported by base members which extend longitudinally for the length of the press. The upper platen 26 is supported by transverse I-beams 19 which can be pulled downwardly by suitable actuators. There are a plurality, or series, of these beams 20 and 19 and each of the upper beams 19 is provided with its own pair of actuators (not shown for sake of clarity). The upper beams 19 form an upper support structure 17 and the lower beams 20 a lower support structure 18.

The platens 26 and 27 each extend for the full length of the pressing zone 3 as one piece constructions, excepting that as suggested in FIG. 1, the upper one may in two sections to define a converging entrance zone for the work so that the latter can receive a gradually increasing pressure as it initially enters the press.

Roller chain loops providing the anti-friction means between these platens and the steel strip conveyor belt spans throughout the pressing zone 3, are generally indicated in FIG. 1 as the roller chains extending between the lower belt 2 and the lower platen 27 and being individually looped by individual looping sprocket wheels approximately positioned and which are unpowered and rotatively freed from one another. It can be seen that these roller chain loops 60, encircle both the lower platen 27 and its supporting beams 20. By lengthening the upper belt loop 1, the same arrangement could be used for the upper roller chain loops 60 which must run between the upper belt loop and the upper platen 26.

This is an arrangement more fully described in the aforementioned co-pending applications. As described therein, pressure and, if desired, heat is transmitted through the roller chains 60 and the conveyors 1 and 2 to the strip of material 4.

Figures 2, 3:
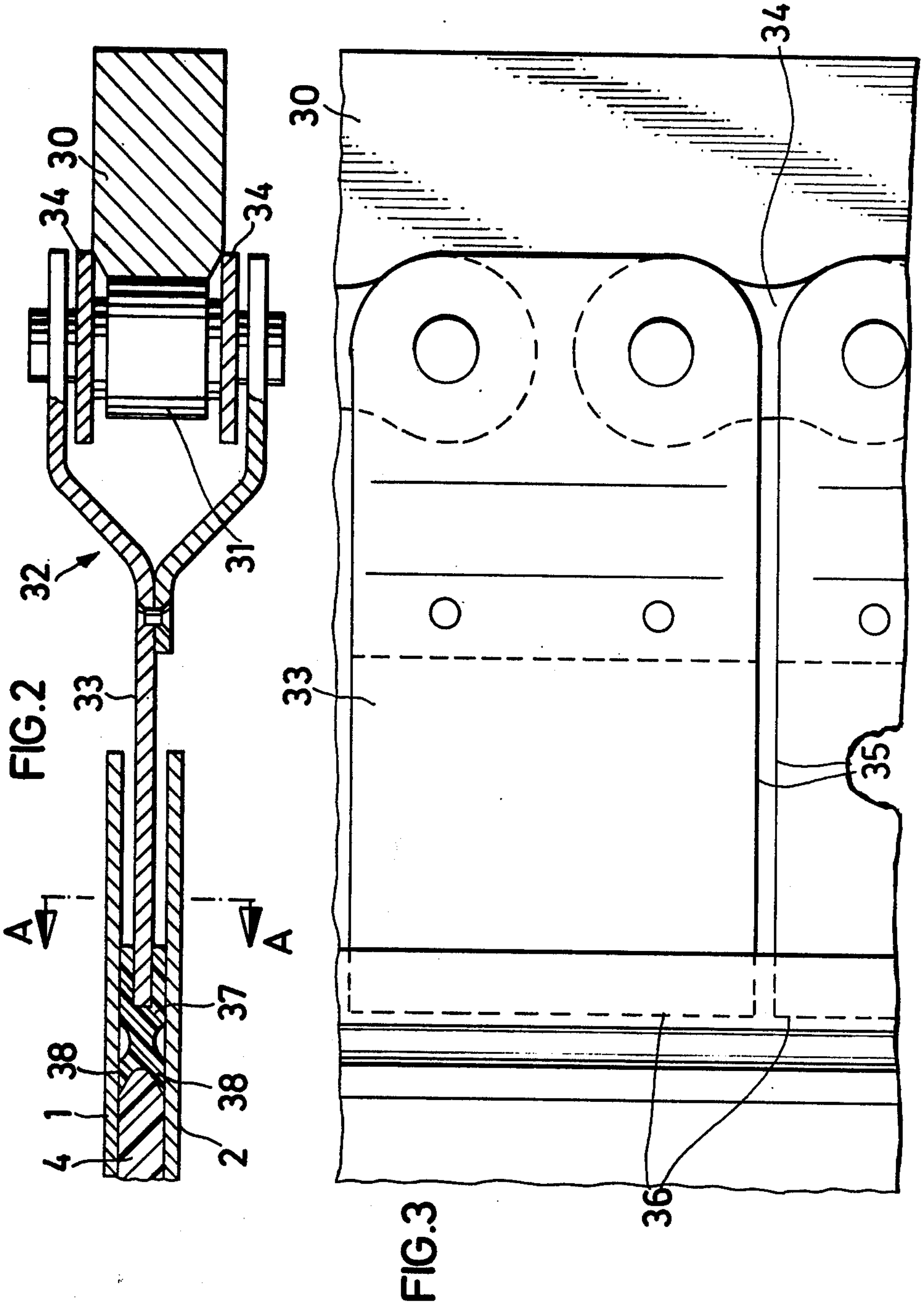
FIG. 2 is a partial cross section through the edge region of the conveyor belts of FIG. 1 illustrating the seal of the present invention disposed therein.
FIG. 3 is a plan view of the arrangement of FIG. 2 with the upper conveyor belts omitted.

FIG. 2 illustrates a cross-sectional view through a portion of the two conveyor belts 1 and 2 in the pressure zone 3 illustrating the manner in which sealing is obtained according to the present invention. Parallel to the edge of the conveyor belts 1 and 2 a support rail 30 is provided. The support rail 30 is rigidly attached to one of the support structures such as the support structure 18 of FIG. 1. Conducted over this support rail 30, also illustrated on FIG. 3, is a link roller chain designated generally as 32. The roller chain 32 includes rollers 31 which are linked together. A first type of link comprises a rectangular plate 33. These rectangular plates 33 are elongated and extend toward and between the conveyor belts 1 and 2. As illustrated, the edges 35 of adjacent links 33 are quite close together and form supports for a flexible sealing strip 37 which is attached thereover. The remaining links in the chain 32 are short links 34. With this construction, the edges 36 of the projecting links 33 form an edge which is almost uninterrupted to support the sealing strip 37 against the outward forces of the strip of material 4 which is being pressed between belts 1 and 2.

To further inhance the sealing action, the sealing strip 37 has sealing lips 38 at its end. The material 4 under pressure enters the gap between the lips 38 to force them outward to increase sealing against the conveyor belts 1 and 2. This permits a better seal and furthermore permits taking up any variation in the gap width between the belts 1 and 2. As noted above, the sealing strip 37 along with the roller chain 32 move along with and are carried by the conveyor 1 and 2.

The manner in which the chain 32 is directed outside the pressure zone 3 is illustrated by FIG. 4. At each end of the zone 3, i.e. the longitudinal section where pressure is applied, sprocket wheels 39 are disposed supported for rotation about vertical axes. The support rail 30 terminates at the sprocket. Although only one sprocket is shown, it will recognized that sprockets are provided at each end of the zone 3. The chain 32 with its links 33 are directed around the sprocket 39 and then around another sprocket 39 at the other end after which they again engage the support rail 30. Thus, the chain and the sealing strip 37 continuously circulate in the plane of the strip 4 being formed. It is not necessary to provide a separate drive for the sprocket wheels 39 since the high pressure in the system results in the chains being carried along by the sealing strip 37.

FIG. 5 shows an alternate form for the sealing strip 37. In this case the strip, which is elastically flexible, is rigidly connected to the conveyor belt 2 such that it able to withstand the left to right forces caused by the pressing of the material 4. The sealing strip 37 circulates in the plane of the convyor belt 2. It is important that the strip 37 be separate from the conveyor 2 and be of substantially greater flexibility so that the resistance to bending of the conveyor belt 2 which must be directed over the drums 11 and 12 is not appreciably increased.

Furthermore, it is essential, as illustrated by both FIGS. 2 and 5, that the sealing strip 37 be located within the region indicated by the line A—A. This designates the region in which the conveyor belts 1 and 2 are supported by the structure 17 and 18. If the sealing strips 37 were placed to the right of the line aa then the conveyor belts 1 and 2 could open up at that point to make the seal ineffective.

Thus, an arrangement for providing sealing of the edges of a continuous press has been shown. Although a specific embodiment has been illustrated and described, it will be obvious to those skilled in the art that various modifications may be made without departing from the spirit of the invention which is intended to be limited solely by the appended claims.

I claim:

1. In an apparatus for extering a flat pressure on a longitudinal section of an advancing strip such as a continuous press for the continuous production of panel materials being produced under pressure, in which the strip is conducted between endless forming bands extending across the width of the strip and circulating in the direction in which the strip advances with pressure transmitted to the endless forming bands by support structures, the improvement comprising sealing strips which are separate from the forming bands disposed between said bands near their edges and supported to move through the longitudinal section with said bands to laterally seal the space containing said advancing strip in a pressure tight manner, said sealing strips comprising endless circulating sealing strips made of an elastic material and having upper and lower sealing lips with an opening therebetween directed toward the inner space between said forming bands whereby pressure entering said opening from the material between said forming bands will act to force said lips outward to increase sealing against said forming bands, and means supporting said sealing strips such that said sealing strips engage between said forming bands before the beginning of said longitudinal section and disengage from said sealing strips being disposed between said forming bands in a zone in which the forming bands are supported by the support structure said means supporting said sealing strips including means disposed outside said forming bands for circulation in a horizontal plane at the level of the space between said forming bands such that they engage between said forming bands over said longitudinal section.

2. Apparatus according to claim 1 wherein said means supporting said sealing strips comprise, for each sealing strip, at least first and second sprocket wheels supported for rotation about vertical axes, an endless link chain running over said sprocket wheels and having one length parallel to the edges of said forming bands, said chain containing links having portions extending laterally between said forming bands, with said sealing strip supported against said laterally extending projections.

3. Apparatus according to claim 2 wherein said link chain is a roller chain and further including a support rail disposed parallel to the edge of said forming bands upon which the rollers of said roller chain roll.

4. Apparatus according to claim 3 wherein every other link of said chain forms a substantially rectangular projecting plate with the other half of the links constructed as short links so that said links forming rectangular plates, which when the link chain is conducted rectilinerly, follow one another with only short spacings to form a substantially uninterrupted support edge for said sealing strip.

5. In an apparatus for exerting a flat pressure on a longitudinal section of an advancing strip such as a continuous press for the continuous production of panel materials being produced under pressure, in which the strip is conducted between endless forming bands extending across the width of the strip and circulating in the direction in which the strip advances with pressure transmitted to the endless forming bands by support structures, the improvement comprising sealing strips which are separate from the forming bands disposed between said bands near their edges and supported to move through the longitudinal section with said bands to laterally seal the space containing said advancing strip in a pressure tight manner, said sealing strips comprising endless circulating sealing strips and means supporting said sealing strips such that said sealing strips engage between said forming bands before the beginning of said longitudinal section and disengage from said forming bands after leaving said longitudinal section, said sealing strips being disposed between said forming bands in a zone in which the forming bands are supported by the support structure supporting said sealing strips comprising, for each sealing strip, at least first and second sprocket wheels supported for rotation about vertical axis, an endless link chain running over said sprocket wheels and having one length parallel to the edges of said forming bands, said chain containing links having portions extending laterally between said forming bands with said sealing strip supported against said laterally extending projections, the remainder of said means being disposed outside said forming bands and resulting in circulation in a horizontal plane at the level of the space between said forming bands such that said sealing means engage between said forming bands over said longitudinal section, said link chain being a roller chain and further including a support rail disposed parallel to the edge of said forming bands upon which the rollers of said roller chain roll.

6. Apparatus according to claim 5 wherein every other link of said chain forms a substantially rectangular projecting plate with the other halves of the links constructed as short links so that said links forming rectangular plates which, when the link chain is conducted rectilinearly follow one another with only short spacings for form a substantially uninterrupted support edge for said sealing strip.

* * * * *